United States Patent
Morooka

(10) Patent No.: US 8,344,064 B2
(45) Date of Patent: Jan. 1, 2013

(54) THERMOPLASTIC RESIN COMPOSITION AND LAMINATE AND TIRE MANUFACTURED USING THE SAME

(75) Inventor: Naoyuki Morooka, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 448 days.

(21) Appl. No.: 12/610,512

(22) Filed: Nov. 2, 2009

(65) Prior Publication Data

US 2010/0112257 A1     May 6, 2010

(30) Foreign Application Priority Data

Nov. 5, 2008 (JP) ................................. 2008-284658
Feb. 27, 2009 (JP) ................................. 2009-046905

(51) Int. Cl.
*C08L 77/00* (2006.01)
*C08L 23/06* (2006.01)
*C08L 29/02* (2006.01)

(52) U.S. Cl. ................ 525/57; 525/56; 525/58; 525/60; 525/66; 525/178; 525/179; 525/181

(58) Field of Classification Search .................... 525/56, 525/57, 58, 60, 66, 178, 179, 181
See application file for complete search history.

(56) References Cited

U.S. PATENT DOCUMENTS

| | | | |
|---|---|---|---|
| 4,567,238 A | 1/1986 | Sasaki et al. | |
| 4,803,247 A | 2/1989 | Altman et al. | |
| 4,861,815 A | 8/1989 | Schultz et al. | |
| 5,278,229 A * | 1/1994 | Asano et al. | 525/57 |
| 5,910,544 A | 6/1999 | Ozawa et al. | |
| 6,079,465 A | 6/2000 | Takeyama et al. | |
| 6,179,941 B1 | 1/2001 | Yamakawa et al. | |
| 2010/0147432 A1 | 6/2010 | Morooka | |

FOREIGN PATENT DOCUMENTS

| | | |
|---|---|---|
| EP | 1669411 A1 | 6/2006 |
| EP | 1974907 A1 | 10/2008 |
| JP | 2-105821 | 4/1990 |
| JP | 8-259741 A | 10/1996 |
| JP | 10-114840 A | 5/1998 |
| JP | 2000-160024 A | 6/2000 |
| JP | 2001-050434 | 2/2001 |
| WO | WO-86/00631 | 1/1986 |
| WO | WO-2007/083785 | 7/2007 |
| WO | WO-2008/053815 A1 | 5/2008 |

OTHER PUBLICATIONS

Extended European Search Report issued in related European Application No. 10193634.2 on Mar. 1, 2012.

* cited by examiner

*Primary Examiner* — Ana Woodward
(74) *Attorney, Agent, or Firm* — Connolly Bove Lodge & Hutz LLP

(57) ABSTRACT

There is provided a thermoplastic resin composition which comprises a modified rubber having excellent low-temperature durability dispersed in a polyamide resin matrix in order to improve the low-temperature durability or repeated fatigue resistance of the polyamide resin and which maintains its flowability and can be formed into a film even at a high content of the modified rubber, and has excellent low-temperature durability. The thermoplastic resin composition comprises a modified polyamide resin (A) obtained by melt blending 100 parts by weight of a polyamide resin (A1) and 0.05 to 5 parts by weight of a compound (A2) capable of binding to a terminal amino group of the polyamide resin, at a temperature equal to or higher than the melting point of the polyamide resin (A1), and a modified rubber (B) having an acid anhydride group, an epoxy group, or a carboxyl group or a derivative thereof. The compound (A2) is preferably a monofunctional epoxy compound. The film of the thermoplastic resin composition is suitably used for the manufacture of tires and hoses.

6 Claims, No Drawings

THERMOPLASTIC RESIN COMPOSITION AND LAMINATE AND TIRE MANUFACTURED USING THE SAME

CROSS REFERENCE TO RELATED APPLICATIONS

This application claims priority to JP 2008-284658 filed Nov. 5, 2008 and JP 2009-046905 filed Feb. 27, 2009, the entire contents of all are hereby incorporated by reference.

TECHNICAL FIELD

The present invention relates to a thermoplastic resin composition comprising a polyamide resin and a modified rubber. In particular, the present invention relates to a thermoplastic resin composition comprising a polyamide resin matrix and a modified rubber dispersed in the polyamide resin matrix in order to improve the low-temperature durability or repeated fatigue resistance of the polyamide resin. The present invention further relates to a laminate, a tire, and a hose manufactured using the thermoplastic resin composition.

BACKGROUND ART

A thermoplastic elastomer composition having excellent balance of air permeation resistance and flexibility, which comprises a specific thermoplastic resin matrix and a specific elastomer component dispersed as a discontinuous phase in a specific thermoplastic resin matrix. See Japanese Unexamined Patent Publication No. 08-259741.

It is also known that a high content of an elastomer component in a thermoplastic elastomer composition can be accomplished by adjusting the melt viscosity of the thermoplastic resin component ($\eta_m$), the melt viscosity of the elastomer component ($\eta_d$), and the difference of solubility parameters of the elastomer component and thermoplastic resin component ($\Delta SP$) such that $\eta_m$, $\eta_d$ and $\Delta SP$ satisfy a specific relationship, thereby to obtain a thermoplastic elastomer composition with improved flexibility and excellent gas permeation resistance. In addition, a pneumatic tire manufactured using the thermoplastic elastomer composition as an air permeation preventive layer is known. See Japanese Unexamined Patent Publication No. 10-25375.

Furthermore, a thermoplastic elastomer composition is known which comprises a thermoplastic elastomer comprising a thermoplastic resin as a continuous phase and a rubber composition as dispersed phases, and a barrier resin composition dispersed in flat phases in the thermoplastic elastomer, which has improved gas permeation resistance as well as flexibility, oil resistance, cold resistance, and heat resistance. See Japanese Unexamined Patent Publication No. 10-114840.

Furthermore, a thermoplastic elastomer composition obtained by blending an acid anhydride-modified ethylene-based polymer with an aliphatic polyamide resin modified with lamellar silicate is also known. See Japanese Unexamined Patent Publication No. 2000-160024.

Citation List

Patent Literature

[PTL1] Japanese Unexamined Patent Publication No. 08-259741
[PTL2] Japanese Unexamined Patent Publication No. 10-25375
[PTL3] Japanese Unexamined Patent Publication No. 10-114840
[PTL4] Japanese Unexamined Patent Publication No. 2000-160024

SUMMARY OF INVENTION

Technical Problem

There has been a problem in that, when a common polyamide resin is blended with a modified rubber having an acid anhydride group, an epoxy group, or a carboxyl group or a derivative thereof, the polyamide resin reacts with the acid anhydride group, the epoxy group, or the carboxyl group or the derivative thereof, resulting in an extreme decrease in flowability of the melted blend and also a significant decrease in film-formability at high content of the modified rubber.

It is an object of the present invention to provide a thermoplastic resin composition which comprises a polyamide resin matrix and a modified rubber with excellent low-temperature durability dispersed in the polyamide resin matrix in order to improve the low-temperature durability or repeated fatigue resistance of the polyamide resin and which keeps its flowability and can be formed into a film even with a high content of the modified rubber, and has excellent low-temperature durability.

Solution to Problem

The present invention provides a thermoplastic resin composition comprising a modified polyamide resin (A) obtained by melt, blending 100 parts by weight of a polyamide resin (A1) and 0.05 to 5 parts by weight of a compound (A2) capable of binding to a terminal amino group of the polyamide resin, at a temperature equal to or higher than the melting point of the polyamide resin (A1), and a modified rubber (B) having an acid anhydride group, an epoxy group, or a carboxyl group or a derivative thereof.

In the present invention, the compound (A2) capable of binding to a terminal amino group of the polyamide resin is preferably a monofunctional epoxy compound.

In the present invention, the polyamide resin (A1) is preferably at least one selected from the group consisting of nylon 11, nylon 12, nylon 6, nylon 66, nylon 666, nylon 612, nylon 610, nylon 46, nylon 66612 and aromatic nylons.

In the present invention, the modified rubber (B) is preferably an ethylene-α-olefin copolymer, or an ethylene-unsaturated carboxylic acid copolymer or a derivative thereof.

Furthermore, the thermoplastic resin composition of the present invention preferably comprises 100 parts by weight of the modified polyamide resin (A) and 50 to 150 parts by weight of the modified rubber (B).

The thermoplastic resin composition of the present invention preferably further comprises an ethylene-vinyl alcohol copolymer (C).

Preferably, the weight ratio of the modified polyamide resin (A) to the ethylene-vinyl alcohol copolymer (C) is 90/10 to 10/90, and the thermoplastic resin composition comprises 50 to 150 parts by weight of the modified rubber (B) based on 100 parts by weight of a total of the modified polyamide resin (A) and the ethylene-vinyl alcohol copolymer (C) when the thermoplastic resin composition comprises the modified polyamide resin (A), the modified rubber (B) and an ethylene-vinyl alcohol copolymer (C).

The present invention also provides a laminate comprising at least one film of the thermoplastic resin composition and at least one sheet of a rubber composition containing a diene component.

In the laminate of the present invention, the rubber composition preferably comprises 30 to 100 percent by weight of a halogenated butyl rubber based on polymer components in the rubber composition.

The present invention also provides a tire comprising a film of the thermoplastic resin composition or the laminate.

The present invention also provides a hose comprising a film of the thermoplastic resin composition or the laminate.

Advantageous Effects of Invention

According to the present invention, there is provided a thermoplastic resin composition which keeps its flowability and can be formed into a film even at high content of a modified rubber having an acid anhydride group, an epoxy group, or a carboxyl group or a derivative thereof, and has excellent low-temperature durability, by using a modified polyamide resin obtained by melt blending beforehand a polyamide resin and 0.05 to 5 parts by weight of a compound capable of binding to a terminal amino group of the polyamide resin.

A film comprising the thermoplastic resin composition of the present invention and a laminate containing the film can be used in applications where low-temperature durability is demanded, such as the inner liners of tires and hoses.

DESCRIPTION OF EMBODIMENTS

The thermoplastic resin composition of the present invention comprises a modified polyamide resin (A) and a modified rubber (B) having an acid anhydride group, an epoxy group, or a carboxyl group or a derivative thereof.

The modified polyamide resin (A) used in the present invention is a resin obtained by melt blending 100 parts by weight of a polyamide resin (A1) and 0.05 to 5 parts by weight of a compound (A2) capable of binding to a terminal amino group of the polyamide at a temperature equal to or higher than the melting point of the polyamide resin (A1).

The polyamide resin (A1) includes, but is not limited to, nylon 11, nylon 12, nylon 6, nylon 66, nylon 666, nylon 612, nylon 610, nylon 46, nylon 66612, aromatic nylons, and combinations thereof. Among these, nylon 6 and nylon 666 are preferable in terms of coexistence of fatigue resistance and gas barrier properties.

The compound (A2) capable of binding to a terminal amino group of the polyamide resin includes, but is not limited to, monofunctional epoxy compounds, isocyanate group-containing compounds, acid anhydride group-containing compounds, halogenated alkyl group-containing compounds, and the like. A preferable compound (A2) is a monofunctional epoxy compound in terms of reactivity with a terminal amino group of the polyamide resin.

The monofunctional epoxy compound includes, but is not limited to, ethylene oxide, epoxypropane, 1,2-epoxybutane, 2,3-epoxybutane, 3-methyl-1,2-epoxybutane, 1,2-epoxypentane, 4-methyl-1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 5-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-propyl-2,3-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 6-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane; 3,4-epoxydecane, 4,5-epoxydecane, 5,6-epoxydecane, 1,2-epoxyundecane, 2,3-epoxyundecane, 3,4-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-epoxypropane, 3-phenyl-1,2-epoxypropane, 1-phenyl-1,2-epoxybutane, 3-phenyl-1,2-epoxybutane, 4-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, glycidol, 3,4-epoxy-1-butanol, 4,5-epoxy-1-pentanol, 5,6-epoxy-1-hexanol, 6,7-epoxy-1-heptanal, 7,8-epoxy-1-octanol, 8,9-epoxy-1-nonanol, 9,10-epoxy-1-decanol, 10,11-epoxy-1-undecanol, 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-1-hexanol, 3,4-epoxy-5-methyl-2-hexanol, 3,4'-epoxy-5,5-dimethyl-2-hexanol, 3,4-epoxy-3-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-3-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-5-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane, 1,2-epoxycyclododecane, 3,4-epoxycyclopentene, 3,4-epoxycyclohexene, 3,4-epoxycycloheptene, 3,4-epoxycyclooctene, 3,4-epoxycyclononene, 1,2-epoxycyclodecene, 1,2-epoxycycloundecene, 1,2-epoxycyclododecene, 1-butoxy-2,3-epoxypropane, 1-allyloxy-2,3-epoxypropane, polyethylene glycol butyl glycidyl ether, 2-ethylhexyl glycidyl ether, phenyl glycidyl ether, p-sec-butylphenyl glycidyl ether, and the like. An especially preferable monofunctional epoxy compound is an epoxy compound having 3 to 20 carbons, preferably 3 to 13 carbons, and having an ether and/or a hydroxyl group in terms of compatibility with the polyamide resin.

Although the method for melt blending of the polyamide resin (A1) and the compound (A2) capable of binding to a terminal amino group of the polyamide resin is not specifically limited, one exemplary method involves introducing the polyamide resin (A1) and the compound (A2) capable of binding to a terminal amino group of the polyamide resin into a twin screw kneader and melt kneading the two components at a temperature equal to or higher, but preferably 20° C. higher than the melting point of the polyamide resin (A1), for example at 240° C. The time for melt kneading is, for example, 1 to 10 minutes, preferably 2 to 5 minutes.

When a monofunctional epoxy compound as the compound (A2) capable of binding to the terminal amino groups of the polyamide resin is melt blended, the monofunctional epoxy compound

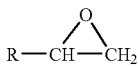

binds to a terminal amino group of the polyamide resin (A1), changing the terminal amino group as follows:

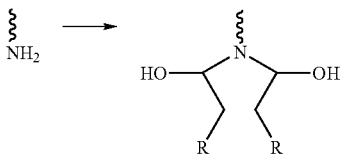

Since this reaction eliminates or decreases the number of terminal amino groups of the polyamide resin (A1), even when high content of the modified rubber (B) having an acid anhydride group, an epoxy group, or a carboxyl group or a derivative thereof is introduced, the resulting resin composition keeps its flowability and can be formed into a film.

The amount of the compound (A2) capable of binding to a terminal amino group of the polyamide resin to modify the polyamide resin (A1) is 0.05 to 5 parts by weight, preferably 1 to 3 parts by weight, based on 100 parts by weight of the polyamide resin (A1). If too little of the compound (A2) capable of binding to the terminal amino groups of the polyamide resin is used, the flowability-improving effect at high content of the modified rubber (B) is poor. On the other hand, if too much of the compound (A2) is used, the low-temperature durability or repeated fatigue resistance of the polyamide resin deteriorates.

The modified rubber (B) to be used in the present invention has an acid anhydride group, an epoxy group, or a carboxyl group or a derivative thereof. The modified rubber (B) especially preferably has an acid anhydride group in terms of compatibility with the polyamide resin.

A rubber which constitutes the modified rubber (B) includes, but is not limited to, ethylene-α-olefin copolymers, or ethylene-unsaturated carboxylic acid copolymers or derivatives thereof, and the like. The ethylene-α-olefin copolymers include, but are not limited to, ethylene-propylene copolymers, ethylene-butene copolymers, ethylene-hexene copolymers, ethylene-octane copolymers, and the like. The ethylene-unsaturated carboxylic acid copolymers or derivatives thereof include, but are not limited to, ethylene-acrylic acid copolymers, ethylene-methacrylic acid copolymers, ethylene-methyl acrylate copolymers, ethylene-methyl methacrylate copolymers, and the like.

A modified rubber having an acid anhydride group can be manufactured, for example, by reacting an acid anhydride and a peroxide with a rubber. In addition, a modified rubber having an acid anhydride group is commercially available, and commercially available products may be employed. The commercially available products include a maleic anhydride-modified ethylene-propylene copolymer. TAFMER® MP-0620 and a maleic anhydride-modified ethylene-butene copolymer. TAFMER® MP-7020 manufactured by Mitsui Chemicals, Inc., and the like.

A modified rubber having an epoxy group can be manufactured, for example, by copolymerizing glycidyl methacrylate and a rubber. In addition, a modified rubber having an epoxy group is commercially available, and commercially available products can be employed. The commercially available products include an epoxy-modified ethylene-methyl acrylate copolymer ESPRENE® EMA2752 manufactured by Sumitomo Chemical Co., Ltd., and the like.

A modified rubber having a carboxyl group or a derivative thereof can be manufactured, for example, by copolymerizing ethylene acrylate and a rubber. In addition, a modified rubber having a carboxyl group or a derivative thereof is commercially available, and commercially available products can be employed. The commercially available products include a carboxyl-modified ethylene-ethyl acrylate copolymer Vamac G manufactured by DuPont KK., and the like.

An especially preferable modified rubber (B) is an ethylene-α-olefin copolymer graft-modified with an acid anhydride group, exemplified by the above-mentioned maleic anhydride-modified ethylene-propylene copolymer TAFMER® MP-0620 manufactured by Mitsui Chemicals, Inc.

The ratio of the modified polyamide resin (A) and the modified rubber (B) in the thermoplastic resin composition is preferably 50 to 150 parts by weight, more preferably 70 to 120 parts by weight of the modified rubber (B) based on 100 parts by weight of the modified polyamide resin (A). The low-temperature durability deteriorates with too little of the modified rubber (B), whereas, with too much of the modified rubber (B), the flowability of the melted resin composition considerably decreases, resulting in extreme deterioration of the film-formability. It is preferable that the modified polyamide resin (A) forms a continuous phase and the modified rubber (B) forms dispersed phases in the thermoplastic resin composition of the present invention.

The thermoplastic resin composition of the present invention preferably further comprises an ethylene-vinyl alcohol copolymer (C). Addition of the ethylene-vinyl alcohol copolymer (C) can improve the gas barrier properties of the thermoplastic resin composition. The ethylene-vinyl alcohol copolymer to be used is not specifically limited, and commercially available products may be used. For example, EVAL-H171B manufactured by Kuraray Co., Ltd. may be employed.

When the thermoplastic resin composition of the present invention comprises an ethylene-vinyl alcohol copolymer (C), the weight ratio of the modified polyamide resin (A) to the ethylene-vinyl alcohol copolymer (C) is preferably 90/10 to 10/90, more preferably 80/20 to 20/80. There is little improvement in the gas barrier properties when the amount of the ethylene-vinyl alcohol copolymer (C) is small, whereas the low-temperature durability substantially deteriorates with much of the ethylene-vinyl alcohol copolymer (C).

When the thermoplastic resin composition of the present invention comprises an ethylene-vinyl alcohol copolymer (C), preferably 50 to 150 parts by weight of, more preferably 70 to 120 parts by weight of the modified rubber (B) is blended with 100 parts by weight of a total of the modified polyamide resin (A) and the ethylene-vinyl alcohol copolymer (C). When the ratio of the modified rubber (B) is too low, the low-temperature durability is poor, whereas, when the ratio is too high, the flowability of the melted resin composition extremely decreases, resulting in substantial deterioration of the film-formability.

The thermoplastic resin composition of the present invention can be manufactured by melt blending the modified polyamide resin (A) and the modified rubber (B) (alternatively the modified polyamide resin (A), the modified rubber (B) and the ethylene-vinyl alcohol copolymer (C) when the thermoplastic resin composition of the present invention comprises the ethylene-vinyl alcohol copolymer (C)), for example, at a temperature 20° C. higher than the melting point of the modified polyamide resin.

In addition to the components mentioned above, various additives commonly blended with resin and rubber compositions may be blended with the thermoplastic resin composition of the present invention, such as reinforcing agents or fillers including carbon black and silica, vulcanizing or crosslinking agents, vulcanizing or crosslinking accelerators, plasticizers, various oils, anti-aging agents. Such additives may be kneaded by common methods to provide compositions which are used for vulcanization or cross-linking. These additives may be blended in conventional amounts as long as the amounts do not have detrimental effects to the objects of the present invention.

The thermoplastic resin composition of the present invention can be made into films by using a T-die extruder, an inflation extruder, and the like. The film has excellent gas barrier properties, heat resistance, and flexural fatigue resistance and, hence, can be suitably used as an inner liner of a pneumatic tire. The film may be laminated with a sheet of a rubber composition containing a diene component to provide a laminate.

The laminate of the present invention comprises at least one film of the thermoplastic resin composition and at least one sheet of a rubber composition containing a diene component. A rubber constituting the rubber composition containing a diene component includes, but is not limited to, natural rubbers, emulsion-polymerized styrene butadiene rubbers, solution-polymerized styrene butadiene rubbers, high cis-butadiene rubbers, low cis-butadiene rubbers, isoprene rubbers, acrylonitrile butadiene rubbers, hydrogenised nitrile rubbers, butyl rubbers, halogenated butyl rubbers, chloroprene rubbers. Among these rubbers, a halogenated butyl rubber is preferable because it directly adheres to the film of the thermoplastic resin composition of the present invention upon application of heat. Preferably, a halogenated butyl rubber constitutes 30 to 100 percent by weight of polymer components of the rubber composition. A too low content of a halogenated butyl rubber is not preferable because the resulting sheet cannot be directly adhered to a film of the thermoplastic resin composition of the present invention by heat, requiring an adhesive to be used.

In addition to the components mentioned above, various additives commonly blended with resin and rubber compositions may be blended with the rubber composition containing a diene component, such as reinforcing agents or fillers including carbon black and silica, vulcanizing or cross-linking agents, vulcanizing or cross-Linking accelerators, plasticizers, various oils, anti-aging agents. These additives may be blended in conventional amounts as long as the amounts do not have detrimental effects to the objects of the present invention.

The tire of the present invention is a tire, preferably a pneumatic tire, comprising a film of the thermoplastic resin composition or the laminate. Common methods for manufacturing tires may be used. For example, when a film of the thermoplastic resin composition of the present invention is used as an inner liner of a pneumatic tire, the thermoplastic resin composition of the present invention is extruded into a film of a predetermined width and thickness and the resulting film is placed on a tire-building drum to form a cylindrical form. Then members commonly used for tire manufacturing, such as a carcass layer, a belt layer, and a tread layer, which are composed of unvulcanized rubber, are stacked on the film sequentially and the drum is withdrawn to make a green tire. Then the green tire can be heated for vulcanization by the conventional method to manufacture a desired pneumatic tire.

The hose of the present invention is a hose comprising a film of the thermoplastic resin composition or the laminate. Common methods for manufacturing hoses may be used for manufacturing hoses using the thermoplastic resin composition of the present invention. For example, a hose may be manufactured as follows. A thermoplastic resin composition of the present invention is extruded on a mandrel coated with a releasing agent beforehand, by a resin extruder in a crosshead extrusion manner to form an inner tube. Furthermore, another thermoplastic resin composition of the present invention or a general thermoplastic rubber composition may be extruded on the inner tube to form an outer layer of the inner tube. Then an adhesive is applied, for example by spraying, on the inner tube, as required. Furthermore, a reinforcing yarn or a reinforcing wire is braided on the inner tube by using a braiding machine. After an adhesive is applied on the reinforcing layer for adhesion to an outer tube as required, the thermoplastic resin composition of the present invention or a general thermoplastic rubber composition is extruded by using a crosshead extruder to form an outer tube. Finally the mandrel is withdrawn to obtain a hose. An adhesive to be used on the inner tube or the reinforcing layer includes, but is not limited to, isocyanate-based, urethane-based, phenol resin-based, resorcin-based, chlorinated rubber-based, or HRH-based adhesives. Isocyanate-based and urethane-based adhesives are especially preferable.

EXAMPLES (1) Raw Materials

The following two kinds of polyamide resins were used.

Nylon 6: "UBE NYLON" 1022B manufactured by Ube Industries, Ltd.

Nylon 666: "UBE NYLON" 5033B manufactured by Ube Industries, Ltd.

The following three kinds of compounds capable of binding to a terminal amino group of the polyamide resin were used.

Glycidol: EPIOL® OH manufactured by NOF Corporation

Phenyl glycidyl ether: EPIOL® P manufactured by NOF Corporation p-sec-Butylphenyl glycidyl ether: EPIOL® SB manufactured by NOF Corporation The following plasticizer was used.

n-Butylbenzenesulfonamide: BM-4 manufactured by Daihachi Chemical Industry Co., Ltd.

The following modified rubbers were used.

Maleic anhydride-modified ethylene-propylene copolymer: TAFMER® MP-0620 manufactured by Mitsui Chemicals, Inc. This rubber is hereinafter referred to as "MA-EPM".

Maleic anhydride-modified ethylene-butene copolymer: TAFMER® MP-7020 manufactured by Mitsui Chemicals, Inc. This rubber is hereinafter referred to as "MA-EBM".

Maleic anhydride-modified ethylene-octene copolymer: Exxelor® VA1803 manufactured by ExxonMobil Chemical Co., Ltd. This rubber is hereinafter referred to as "MA-EOM".

Maleic anhydride-modified ethylene-ethyl acrylate copolymer: HPR® AR201 manufactured by DuPont-Mitsui Polychemicals Co., Ltd. This rubber is hereinafter referred to as "MA-EEM".

Epoxy-modified ethylene-methyl acrylate copolymer: ESPRENE® EMA2752 manufactured by Sumitomo Chemical Co., Ltd. This rubber is hereinafter referred to as "E-EMA".

As an ethylene-vinyl alcohol copolymer, EVAL® H171B manufactured by Kuraray Co., Ltd. was used.

(2) Preparation of Modified Polyamide Resins

The polyamide resins, the monofunctional epoxy compounds and the plasticizer were introduced into a twin screw kneader (model TEX44, manufactured by The Japan Steel Works, LTD.) in weight ratios shown in Table 1 and melt kneaded at a kneader temperature of 230° C. to obtain 11 kinds of modified polyamide resins, MPA-1 to MPA-11. In addition, the same procedure was repeated without any monofunctional epoxy compound to obtain two kinds of unmodified polyamide resins, PA-1 and PA-2.

[Melt Viscosity]

Melt viscosity means melt viscosity of any component at any temperature in the process of kneading. Since melt viscosity of each polymer material depends on temperature, shear rate and shear stress, stress and shear rate of a polymer material flowing through a capillary in a melted state at a certain temperature, especially in the temperature range of kneading are measured to determine the melt viscosity η according to the following equation:

$$\eta = (\text{shear stress})/(\text{shear rate})$$

In the present invention, melt viscosities (Pa·s) of the thermoplastic resin compositions were measured at 250° C. and at a shear rate of 250 sec$^{-1}$ with a capillary rheometer Capillograph 1C manufactured by Toyo Seiki Seisaku-sho, Ltd. Melt viscosities of 1800 Pa·s or lower are preferable in terms of film-formability.

[Film-Formability]

The thermoplastic resin compositions in pellet form were extruded into films of average thickness of 150 μm with a 40

TABLE 1

| | | | | | | | | | | | | (parts by weight) | |
|---|---|---|---|---|---|---|---|---|---|---|---|---|---|
| | PA-1 | PA-2 | MPA-1 | MPA-2 | MPA-3 | MPA-4 | MPA-5 | MPA-6 | MPA-7 | MPA-8 | MPA-9 | MPA-10 | MPA-11 |
| Nylon 6 | 100 | | 100 | 100 | 100 | 100 | 100 | | 100 | 100 | 100 | 100 | 100 |
| Nylon 666 | | 100 | | | | | | 100 | | | | | |
| Glycidol | | | 0.3 | 1 | 2 | 3 | | 1 | | 0.01 | 6 | | |
| Phenyl glycidyl ether | | | | | | | 1 | | | | | | |
| p-sec-Butylphenyl glycidyl ether | | | | | | | | | 1 | | | 0.01 | 6 |
| n-Butylbenzene-sulfonamide | 30 | 30 | 30 | 30 | 30 | 30 | 30 | 30 | 30 | 30 | 30 | 30 | 30 |
| Total | 130 | 130 | 130.3 | 131 | 132 | 133 | 131 | 131 | 131 | 130.01 | 136 | 130.01 | 136 |

(3) Preparation of Thermoplastic Resin Compositions

The modified or unmodified polyamide resins prepared as described above and the acid anhydride-modified ethylene-propylene copolymers were introduced into the twin screw kneader in the weight ratios shown in Tables 2 to 5, melt kneaded at a kneader temperature of 220° C., continuously extruded into strands, water-cooled, and out by a cutter into pellets to obtain the thermoplastic resin compositions in pellet form.

Furthermore, the modified or unmodified polyamide resins prepared as described above, the acid anhydride-modified ethylene-propylene copolymers and the ethylene-vinyl alcohol copolymer were introduced into the twin screw kneader in weight ratios shown in Table 6, melt kneaded at a kneader temperature of 220° C., continuously extruded into strands, water-cooled, and cut by a cutter into pellets to obtain the thermoplastic resin compositions in pellet form.

(4) Evaluation Method of the Thermoplastic Resin Compositions

The resulting thermoplastic resin compositions were tested for melt viscosity, film-forming properties, and an average number of deformation cycles at break (constant strain test at −35° C.) as follows.

mmϕ single screw extruder fitted with a 550 mm-wide T-die (manufactured by PLAGIKEN Co., Ltd.) under the extrusion conditions of extrusion temperature C1/C2/C3/C4/die=200/210/230/235/235° C., cooling roll temperature of 50° C., and take-off speed of 4 m/min. "Good" indicates that a film was formed and "bad" indicates that a film was not formed.

[Constant Strain Test at −35° C. (Average Number of Deformation Cycles at Break)]

The thermoplastic resin compositions in pellet form were extruded into sheets of average thickness of 1 mm with a 40 mmϕ single screw extruder fitted with a 200 mm-wide T-die (manufactured by PLAGIKEN Co., Ltd.) under the extrusion conditions of extrusion temperature C1/C2/C3/C4/die=200/210/230/235/235° C., cooling roll temperature of 50° C., and take-off speed of 0.7 m/min. Then the sheets were cut into pieces with a JIS No. 3 dumbbell and the test pieces were subjected to repeated deformation of 40% at −35° C. For one resin composition, five pieces were tested, and the numbers of deformation cycles at break were averaged to obtain an average number of deformation cycles at break. An average number of deformation cycles at break of 100,000 or more was judged as "passing", whereas an average number of deformation cycles at break of less than 100,000 was judged as "failing".

(5) Evaluation Results of Thermoplastic Resin Compositions

The evaluation results are shown in Tables 2 through 6.

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| PA-1 | [parts by weight] | 130 | 130 | 130 | 130 | 130 |  |
| PA-2 | [parts by weight] |  |  |  |  |  | 130 |
| MPA-1 | [parts by weight] |  |  |  |  |  |  |
| MPA-2 | [parts by weight] |  |  |  |  |  |  |
| MPA-3 | [parts by weight] |  |  |  |  |  |  |
| MPA-4 | [parts by weight] |  |  |  |  |  |  |
| MPA-5 | [parts by weight] |  |  |  |  |  |  |
| MPA-6 | [parts by weight] |  |  |  |  |  |  |
| MPA-7 | [parts by weight] |  |  |  |  |  |  |
| MPA-8 | [parts by weight] |  |  |  |  |  |  |
| MPA-9 | [parts by weight] |  |  |  |  |  |  |
| MPA-10 | [parts by weight] |  |  |  |  |  |  |
| MPA-11 | [parts by weight] |  |  |  |  |  |  |
| MA-EPM | [parts by weight] | 100 |  |  |  |  | 100 |
| MA-EBM | [parts by weight] |  | 100 |  |  |  |  |
| MA-EOM | [parts by weight] |  |  | 100 |  |  |  |
| MA-EEM | [parts by weight] |  |  |  | 100 |  |  |
| E-EMA | [parts by weight] |  |  |  |  | 100 |  |
| Total | [parts by weight] | 230 | 230 | 230 | 230 | 230 | 230 |
| Parts by weight of modified rubber based on 100 parts by weight of polyamide resin |  | 100 | 100 | 100 | 100 | 100 | 100 |
| Melt viscosity | [Pa · s] | 5420 | 6120 | 4530 | 4860 | 4920 | 6210 |
| Film-formability |  | Bad | Bad | Bad | Bad | Bad | Bad |
| Constant strain test at −35° C. |  | — | — | — | — | — | — |

TABLE 3

|  |  | Example 1 | Example 2 | Example 3 | Example 4 | Example 5 | Example 6 | Example 7 | Example 8 |
|---|---|---|---|---|---|---|---|---|---|
| PA-1 | [parts by weight] |  |  |  |  |  |  |  |  |
| PA-2 | [parts by weight] |  |  |  |  |  |  |  |  |
| MPA-1 | [parts by weight] | 130.3 |  |  |  |  |  |  |  |
| MPA-2 | [parts by weight] |  | 131 | 131 | 131 |  |  |  |  |
| MPA-3 | [parts by weight] |  |  |  |  | 132 |  |  |  |
| MPA-4 | [parts by weight] |  |  |  |  |  | 133 |  |  |
| MPA-5 | [parts by weight] |  |  |  |  |  |  | 131 |  |
| MPA-6 | [parts by weight] |  |  |  |  |  |  |  | 131 |
| MPA-7 | [parts by weight] |  |  |  |  |  |  |  |  |
| MPA-8 | [parts by weight] |  |  |  |  |  |  |  |  |
| MPA-9 | [parts by weight] |  |  |  |  |  |  |  |  |
| MPA-10 | [parts by weight] |  |  |  |  |  |  |  |  |
| MPA-11 | [parts by weight] |  |  |  |  |  |  |  |  |
| MA-EPM | [parts by weight] | 100 | 100 | 65 | 120 | 100 | 100 | 100 | 100 |
| MA-EBM | [parts by weight] |  |  |  |  |  |  |  |  |
| MA-EOM | [parts by weight] |  |  |  |  |  |  |  |  |
| MA-EEM | [parts by weight] |  |  |  |  |  |  |  |  |
| E-EMA | [parts by weight] |  |  |  |  |  |  |  |  |
| Total | [parts by weight] | 230.3 | 231 | 196 | 251 | 232 | 233 | 231 | 231 |
| Parts by weight of modified rubber based on 100 parts by weight of polyamide resin |  | 100 | 100 | 65 | 120 | 100 | 100 | 100 | 100 |
| Melt viscosity | [Pa · s] | 1760 | 1240 | 960 | 1790 | 1160 | 1020 | 1220 | 1310 |
| Film-formability |  | Good | Good | Good | Good | Good | Good | Good | Good |
| Constant strain test at −35° C. |  | 520,000 Passing | 560,000 Passing | 180,000 Passing | 860,000 Passing | 340,000 Passing | 250,000 Passing | 560,000 Passing | 820,000 Passing |

TABLE 4

|  |  | Example 9 | Example 10 | Example 11 | Example 12 | Example 13 |
|---|---|---|---|---|---|---|
| PA-1 | [parts by weight] |  |  |  |  |  |
| PA-2 | [parts by weight] |  |  |  |  |  |
| MPA-1 | [parts by weight] |  |  |  |  |  |
| MPA-2 | [parts by weight] | 130 | 130 | 130 | 130 | 130 |

TABLE 4-continued

|  |  | Example 9 | Example 10 | Example 11 | Example 12 | Example 13 |
|---|---|---|---|---|---|---|
| MPA-3 | [parts by weight] |  |  |  |  |  |
| MPA-4 | [parts by weight] |  |  |  |  |  |
| MPA-5 | [parts by weight] |  |  |  |  |  |
| MPA-6 | [parts by weight] |  |  |  |  |  |
| MPA-7 | [parts by weight] |  |  |  |  |  |
| MPA-8 | [parts by weight] |  |  |  |  |  |
| MPA-9 | [parts by weight] |  |  |  |  |  |
| MPA-10 | [parts by weight] |  |  |  |  |  |
| MPA-11 | [parts by weight] |  |  |  |  |  |
| MA-EPM | [parts by weight] | 100 |  |  |  |  |
| MA-EBM | [parts by weight] |  | 100 |  |  |  |
| MA-EOM | [parts by weight] |  |  | 100 |  |  |
| MA-EEM | [parts by weight] |  |  |  | 100 |  |
| E-EMA | [parts by weight] |  |  |  |  | 100 |
| Total | [parts by weight] | 230 | 230 | 230 | 230 | 230 |
| Parts by weight of modified rubber based on 100 parts by weight of polyamide resin |  | 100 | 100 | 100 | 100 | 100 |
| Melt viscosity | [Pa · s] | 1180 | 1220 | 1150 | 1180 | 1120 |
| Film-formability |  | Good | Good | Good | Good | Good |
| Constant strain test at −35° C. |  | 540,000 Passing | 620,000 Passing | 580,000 Passing | 550,000 Passing | 460,000 Passing |

TABLE 5

|  |  | Comparative Example 7 | Comparative Example 8 | Comparative Example 9 | Comparative Example 10 | Comparative Example 11 | Comparative Example 12 |
|---|---|---|---|---|---|---|---|
| PA-1 | [parts by weight] |  |  |  |  | 130 |  |
| PA-2 | [parts by weight] |  |  |  |  |  | 130 |
| MPA-1 | [parts by weight] |  |  |  |  |  |  |
| MPA-2 | [parts by weight] |  |  |  |  |  |  |
| MPA-3 | [parts by weight] |  |  |  |  |  |  |
| MPA-4 | [parts by weight] |  |  |  |  |  |  |
| MPA-5 | [parts by weight] |  |  |  |  |  |  |
| MPA-6 | [parts by weight] |  |  |  |  |  |  |
| MPA-7 | [parts by weight] |  |  |  |  |  |  |
| MPA-8 | [parts by weight] | 130.01 |  |  |  |  |  |
| MPA-9 | [parts by weight] |  | 136 |  |  |  |  |
| MPA-10 | [parts by weight] |  |  | 130.01 |  |  |  |
| MPA-11 | [parts by weight] |  |  |  | 136 |  |  |
| MA-EPM | [parts by weight] | 100 | 100 | 100 | 100 | 40 | 40 |
| MA-EBM | [parts by weight] |  |  |  |  |  |  |
| MA-EOM | [parts by weight] |  |  |  |  |  |  |
| MA-EEM | [parts by weight] |  |  |  |  |  |  |
| E-EMA | [parts by weight] |  |  |  |  |  |  |
| Total | [parts by weight] | 230.01 | 236 | 230.01 | 236 | 170 | 170 |
| Parts by weight of modified rubber based on 100 parts by weight of polyamide resin |  | 100 | 100 | 100 | 100 | 40 | 40 |
| Melt viscosity | [pa · s] | 5150 | 820 | 5230 | 780 | 1680 | 1770 |
| Film-formability |  | Bad | Good | Bad | Good | Good | Good |
| Constant strain test at −35° C. |  | — | 40,000 Failing | — | 30,000 Failing | 20,000 Failing | 40,000 Failing |

TABLE 6

|  |  | Comparative Example 13 | Comparative Example 14 | Example 14 | Example 15 | Example 16 | Example 17 | Comparative Example 15 | Comparative Example 16 |
|---|---|---|---|---|---|---|---|---|---|
| PA-1 | [parts by weight] | 52 |  |  |  |  |  | 52 |  |
| PA-2 | [parts by weight] |  | 52 |  |  |  |  |  | 52 |
| MPA-1 | [parts by weight] |  |  |  |  |  |  |  |  |
| MPA-2 | [parts by weight] |  |  | 52 |  |  |  |  |  |
| MPA-3 | [parts by weight] |  |  |  |  |  |  |  |  |
| MPA-4 | [parts by weight] |  |  |  |  |  |  |  |  |
| MPA-5 | [parts by weight] |  |  |  | 52 |  |  |  |  |
| MPA-6 | [parts by weight] |  |  |  |  | 52 |  |  |  |
| MPA-7 | [parts by weight] |  |  |  |  |  | 52 |  |  |
| MPA-8 | [parts by weight] |  |  |  |  |  |  |  |  |
| MPA-9 | [parts by weight] |  |  |  |  |  |  |  |  |

TABLE 6-continued

|  |  | Comparative Example 13 | Comparative Example 14 | Example 14 | Example 15 | Example 16 | Example 17 | Comparative Example 15 | Comparative Example 16 |
|---|---|---|---|---|---|---|---|---|---|
| MPA-10 | [parts by weight] |  |  |  |  |  |  |  |  |
| MPA-11 | [parts by weight] |  |  |  |  |  |  |  |  |
| EVOH | [parts by weight] | 60 | 60 | 60 | 60 | 60 | 60 | 60 | 60 |
| MA-EPM | [parts by weight] | 100 | 100 | 100 | 100 | 100 | 100 | 40 | 40 |
| MA-EBM | [parts by weight] |  |  |  |  |  |  |  |  |
| MA-EOM | [parts by weight] |  |  |  |  |  |  |  |  |
| MA-EEM | [parts by weight] |  |  |  |  |  |  |  |  |
| E-EMA | [parts by weight] |  |  |  |  |  |  |  |  |
| Total | [parts by weight] | 212 | 212 | 212 | 212 | 212 | 212 | 152 | 152 |
| Parts by weight of modified rubber based on 100 parts by weight of total of polyamide resin and EVOH |  | 100 | 100 | 100 | 100 | 100 | 100 | 40 | 40 |
| Melt viscosity | [Pa · s] | 5420 | 6120 | 1260 | 1220 | 1420 | 1160 | 1560 | 1630 |
| Film-formability |  | Bad | Bad | Good | Good | Good | Good | Good | Good |
| Constant strain test at −35° C. |  | — | — | 140,000 Passing | 160,000 Passing | 240,000 Passing | 140,000 Passing | 5,000 Failing | 20,000 Failing |

The thermoplastic resin compositions of the present invention (Examples 1-17) had low melt viscosities and were capable of being formed into films. In contrast, Comparative Examples 1-6, 13 and 14, which comprised the unmodified polyamide resins, had higher melt viscosities and were incapable of being formed into films. Comparative Examples 7 and 9, which comprised 0.01 parts by weight of the compound (A2) capable of binding to a terminal amino group of the polyamide resin, had high melt viscosities and were incapable of being formed into films. Comparative Examples 8 and 10, which comprised 6 parts by weight of the compound (A2) capable of binding to a terminal amino group of the polyamide resin, failed the constant strain test at −35° C. Furthermore, comparison between Examples 1 to 3 showed that the higher the content of the modified rubber is, the higher average number of deformation cycles at break the resin composition shows in the constant strain test at −35° C.

(6) Preparation of Rubber Compositions

The following raw materials were used to prepare rubber compositions.

Halogenated butyl rubber: BROMOBUTYL X2 manufactured by LANXESS Rubber NV

Natural rubber: SRI20 Manufactured by PT NUSIRA

Emulsion polymerized SBR: NIPOL 1502 manufactured by Zeon Corporation

GPF carbon black: HTC#G manufactured by Nippon Steel Chemical Carbon Co., Ltd.

Hydrated silica: Zeosil® 165GR manufactured by Rhodia

Aromatic oil: Extract 4S manufactured by Showa Shell Sekiyu KK.

Zinc oxide: Zinc Oxide No. 3 manufactured by Seido Chemical Industry Co., Ltd.

Stearic acid: Beads Stearic Acid YR manufactured by NOF Corporation

Sulfur: Golden Flower Sulfur Powder 150 mesh manufactured by Tsurumi Chemical Industry Co., Ltd.

Vulcanizing accelerator: Noxeler DM manufactured by Ouchi Shinko Kagaku KK.

The above-mentioned raw materials except the vulcanizing accelerator were kneaded in weight ratios shown in Table 7 in a 1.7-liter Banbury mixer at a temperature setting of 70° C. for 5 minutes to obtain a master batch, to which the vulcanizing accelerator was added and kneaded with an 8-inch roller to obtain 4 kinds of unvulcanized rubber compositions with thicknesses of 2 mm and 0.5 mm.

TABLE 7

|  |  | Rubber composition 1 | Rubber composition 2 | Rubber composition 3 | Rubber composition 4 |
|---|---|---|---|---|---|
| Halogenated butyl rubber | [parts by weight] | 30 | 60 | 100 | 20 |
| Natural rubber | [parts by weight] | 35 | 20 |  | 40 |
| Emulsion polymerized SBR | [parts by weight] | 35 | 20 |  | 40 |
| GPF carbon black | [parts by weight] | 30 | 30 | 30 | 30 |
| Wet process silica | [parts by weight] | 20 | 20 | 20 | 20 |
| Aromatic oil | [parts by weight] | 7.5 | 7.5 | 7.5 | 7.5 |
| Zinc oxide | [parts by weight] | 3 | 3 | 3 | 3 |
| Stearic acid | [parts by weight] | 1 | 1 | 1 | 1 |
| Sulfur | [parts by weight] | 1 | 1 | 1 | 1 |
| Vulcanizing accelerator | [parts by weight] | 1.5 | 1.5 | 1.5 | 1.5 |
| Total | [parts by weight] | 164 | 164 | 164 | 164 |

(7) Preparation and Evaluation of the Laminates

The thermoplastic resin compositions of Examples 2, 3, 10, and 1.4 and Comparative Example 11 were formed into 150 μm-thick films of the thermoplastic resin compositions in the same manner and under the same conditions as described for the evaluation of film-formability of the thermoplastic resin compositions. In addition, the above-mentioned unvulcanized rubber compositions 1 to 4 were rolled to obtain 2 mm-thick or 0.5 mm-thick unvulcanized rubber composition sheets. One of the prepared films of the thermoplastic resin compositions and one of the unvulcanized rubber composition sheets were laminated to prepare a laminate. The prepared laminates were subjected to laminate adhesion test, tire traveling test 1, tire traveling test 2 and tire air leakage test as follows. The results are shown in Table 8.

[Laminate Adhesion Test]

The laminate comprising the 150 μm-thick thermoplastic resin composition film and the 2 mm-thick unvulcanized rubber composition sheet was vulcanized at 180° C. for 10 minutes and cut with a JIS No. 2 dumbbell into test pieces. Then a cut was made in the central portion of each of the test pieces in the width direction. The test pieces were subjected to repeated 200,000 cycles of deformation of 40% at 70° C. After the test, the test pieces were visually inspected for peeling from the cut and rated according to the following criteria.

Passing: No peeling was seen, or small peeling shorter than 2 mm from the cut was seen, or material failure of the rubber occurred.

Passing: There were less than 10 cracks shorter than 10 mm.

Failing: There were 10 or more cracks shorter than 10 mm, or there was any crack of 10 mm or longer.

[Tire Air Leakage Test]

The laminate comprising the 150 μm-thick thermoplastic resin composition film and the 0.5 mm-thick unvulcanized rubber composition sheet was used as an inner liner (layer for preventing air permeation) for a tire to prepare a radial tire (195/65R15) by the conventional method. The tire was inflated at a pneumatic pressure of 250 kPa and kept at 25° C. for 3 months to measure the internal pressure, which was then compared with the internal pressure of a tire of the same size with a standard inner liner comprising 80 percent by weight of butyl rubber and 20 percent by weight of natural rubber. A tire having a retention rate of the internal pressure equal to or higher than that of the standard tire was rated as passing, whereas a tire having a retention rate of the internal pressure lower than that of the standard tire was rated as failing.

TABLE 8

| Thermoplastic resin composition film | Example 2 | Example 2 | Example 2 | Example 2 | Example 3 | Example 10 | Example 14 | Comparative Example 11 | Comparative Example 11 | Comparative Example 11 |
|---|---|---|---|---|---|---|---|---|---|---|
| Rubber composition sheet | Rubber composition 1 | Rubber composition 2 | Rubber composition 3 | Rubber composition 4 | Rubber composition 2 | Rubber composition 2 | Rubber composition 2 | Rubber composition 1 | Rubber composition 2 | Rubber composition 3 |
| Laminate adhesion test | Passing | Passing | Passing | Failing | Passing | Passing | Passing | Failing | Failing | Failing |
| Tire traveling test 1 | Passing | Passing | Passing | Failing | Passing | Passing | Passing | Failing | Failing | Failing |
| Tire traveling test 2 | Passing | Passing | Passing | Passing | Passing | Passing | Passing | Failing | Failing | Failing |
| Tire air leakage test | Passing | Passing | Passing | Passing | Passing | Passing | Passing | Passing | Passing | Passing |

Failing: Peeling between 2 mm and 10 mm from the cut was seen causing interfacial peeling, or large peeling was seen causing interfacial peeling.

[Tire Traveling Test 1]

The laminate comprising the 150 μm-thick thermoplastic resin composition film and the 0.5 mm-thick unvulcanized rubber composition sheet was used as an inner liner (layer for preventing air permeation) for a tire to prepare a radial tire (195/65R15) by the conventional method. By using a standard rim defined by the JATMA standards, the tire was inflated at an pneumatic pressure of 140 kPa and forced to travel for a distance of 10000 km under a load of 300 kN at a speed of 80 km/h on a drum with an outer diameter of 1700 mm at a room temperature of 38° C. Subsequently, the end of the layer for preventing air permeation of the tire was inspected for peeling.

Passing: No peeling was seen, or peeling shorter than 2 mm was seen.

Failing: Peeling of 2 mm or longer was seen.

[Tire Traveling Test 2]

The laminate comprising the 150 μm-thick thermoplastic resin composition film and the 0.5 mm-thick unvulcanized rubber composition sheet were used as an inner liner (layer for preventing air permeation) for a tire to prepare a radial tire (195/65R15) by the conventional method. By using a standard rim defined by the JATMA standards, the tire was inflated at an pneumatic pressure of 140 kPa and forced to travel for a distance of 2000 km under a load of 300 kN at a speed of 80 km/h on a drum with an outer diameter of 1700 mm at a low temperature of −20° C. Subsequently, the layer for preventing air permeation of the tire was inspected for cracks.

The laminates comprising the films of the thermoplastic resin compositions of Examples of the present invention and the sheets of the rubber compositions were rated as passing in the tire traveling test 2. In contrast, the laminates comprising the films of the thermoplastic resin compositions of the Comparative Examples and the sheets of the rubber compositions were rated as failing in the traveling test 2. It was proven that the laminates comprising the films of the thermoplastic resin compositions of Examples of the present invention and the sheets of the rubber compositions had excellent low-temperature durability.

The laminates comprising the films of the thermoplastic resin compositions of Examples of the present invention and the sheets of the rubber compositions except the laminate comprising the sheet of the rubber composition 4 were rated as passing in the laminate adhesion test and tire traveling test 1. In contrast, the laminates comprising the films of the thermoplastic resin compositions of Comparative Examples and the sheets of the rubber compositions were rated as failing also in the laminate adhesion test and tire traveling test 1.

Industrial Applicability

The thermoplastic resin composition of the present invention can be used for tires, especially pneumatic tires, various resin hoses as well as laminate materials used for rubber products for controlling permeation of various gases (such as fuel gases, air), for example, fenders, rubber bags, and fuel tanks.

The invention claimed is:

1. A thermoplastic resin composition comprising a modified polyamide resin matrix (A) obtained by melt blending 100 parts by weight of a polyamide resin (A1) and 0.05 to 5 parts by weight of a monofunctional epoxy compound (A2), at a temperature equal to or higher than the melting point of the polyamide resin (A1), and a rubber (B) having an acid anhydride group, an epoxy group, or a carboxyl group, wherein the rubber (B) is dispersed in the polyamide resin matrix, and further comprising an ethylene-vinyl alcohol copolymer (C).

2. The thermoplastic resin composition according to claim 1, wherein the weight ratio of the modified polyamide resin (A) to the ethylene-vinyl alcohol copolymer (C) is 90/10 to 10/90, and the thermoplastic resin composition comprises 50 to 150 parts by weight of the rubber (B) based on 100 parts by weight of a total of the modified polyamide resin (A) and the ethylene-vinyl alcohol copolymer (C).

3. The thermoplastic resin composition according to claim 2, wherein the polyamide resin (A1) is at least one selected from the group consisting of nylon 11, nylon 12, nylon 6, nylon 66, nylon 666, nylon 612, nylon 610, nylon 46, nylon 66612 and aromatic nylons.

4. The thermoplastic resin composition according to claim 2, wherein the rubber (B) is an ethylene-α-olefin copolymer or an ethylene-unsaturated carboxylic acid copolymer or a derivative thereof having an acid anhydride group, an epoxy group, or a carboxyl group.

5. The thermoplastic resin composition according to claim 1, wherein the polyamide resin (A1) is at least one selected from the group consisting of nylon 11, nylon 12, nylon 6, nylon 66, nylon 666, nylon 612, nylon 610, nylon 46, nylon 66612 and aromatic nylons.

6. The thermoplastic resin composition according to claim 1, wherein the rubber (B) is an ethylene-α-olefin copolymer or an ethylene-unsaturated carboxylic acid copolymer or a derivative thereof having an acid anhydride group, an epoxy group, or a carboxyl group.

* * * * *